Aug. 27, 1957  C. J. CRETORS  2,803,891
DEVICE FOR STORING AND DISPENSING POPCORN AND THE LIKE
Filed Aug. 13, 1953  3 Sheets-Sheet 1
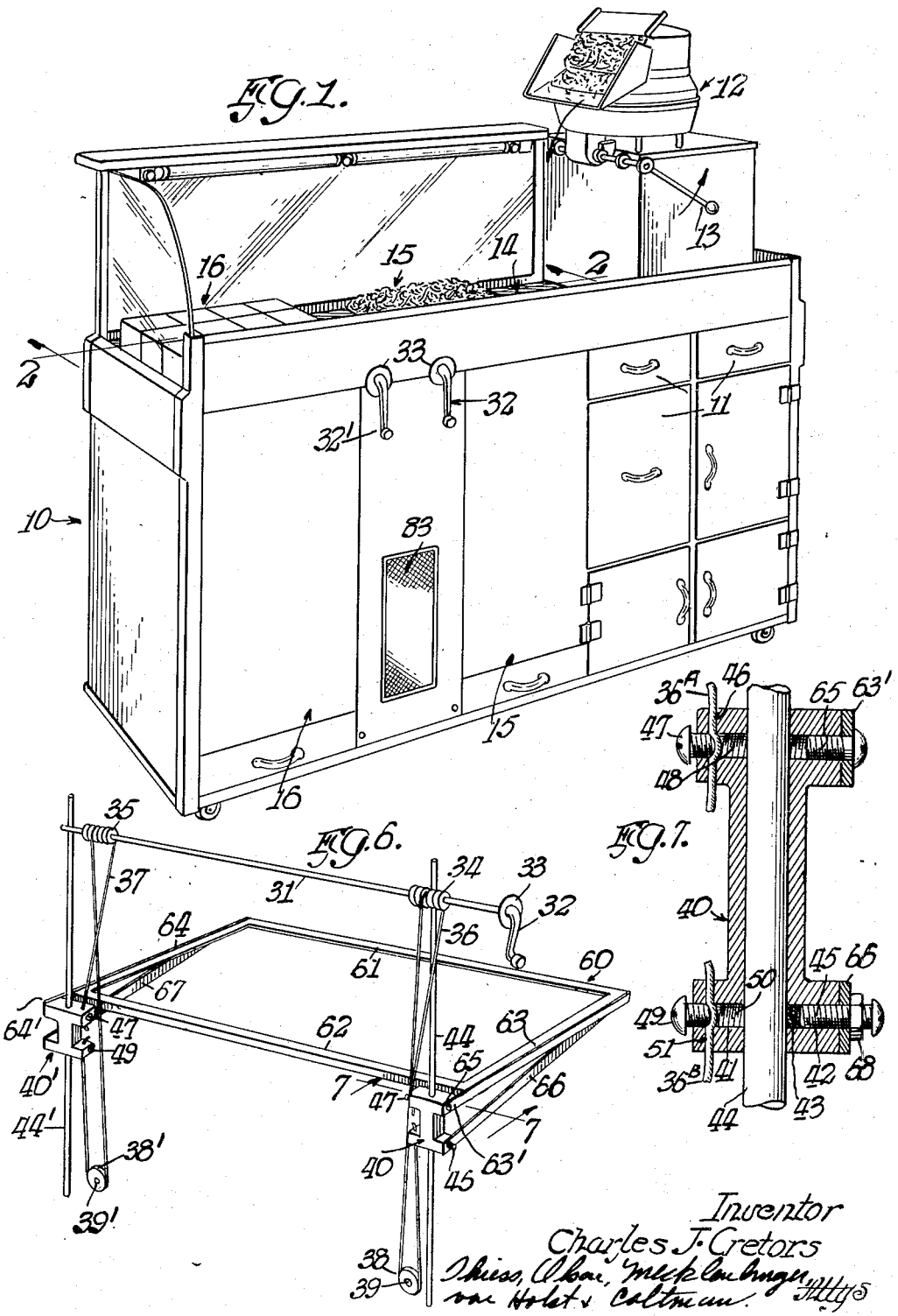
Inventor
Charles J. Cretors Aug. 27, 1957     C. J. CRETORS     2,803,891
DEVICE FOR STORING AND DISPENSING POPCORN AND THE LIKE
Filed Aug. 13, 1953     3 Sheets-Sheet 2
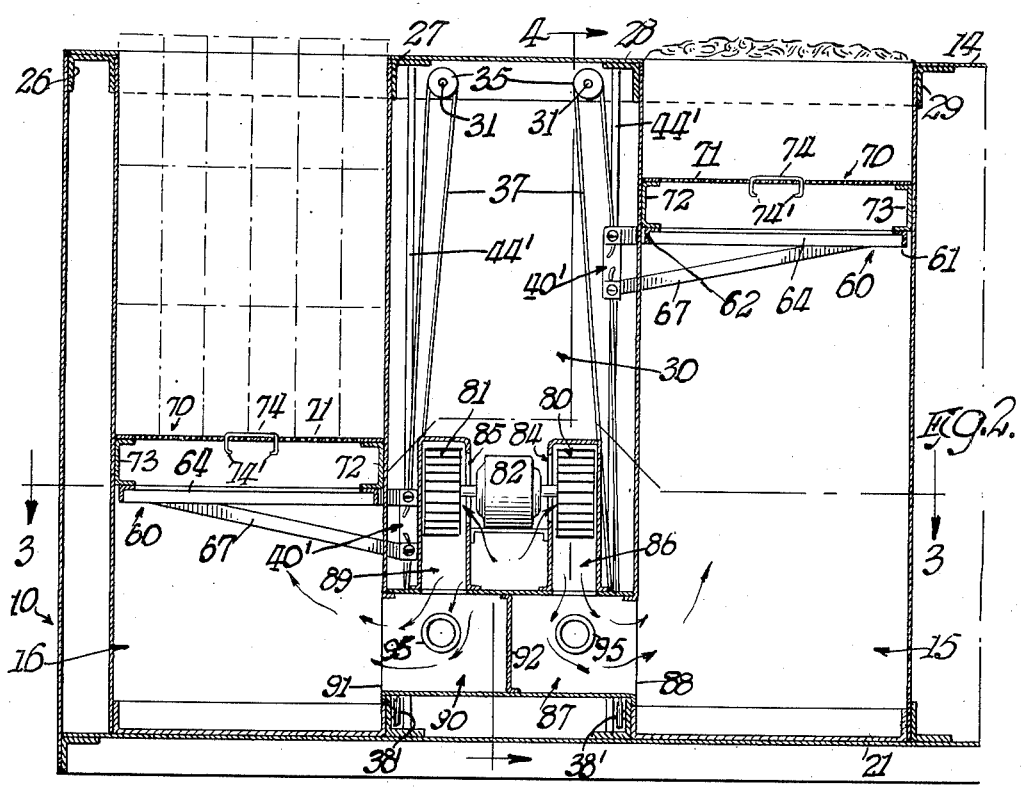
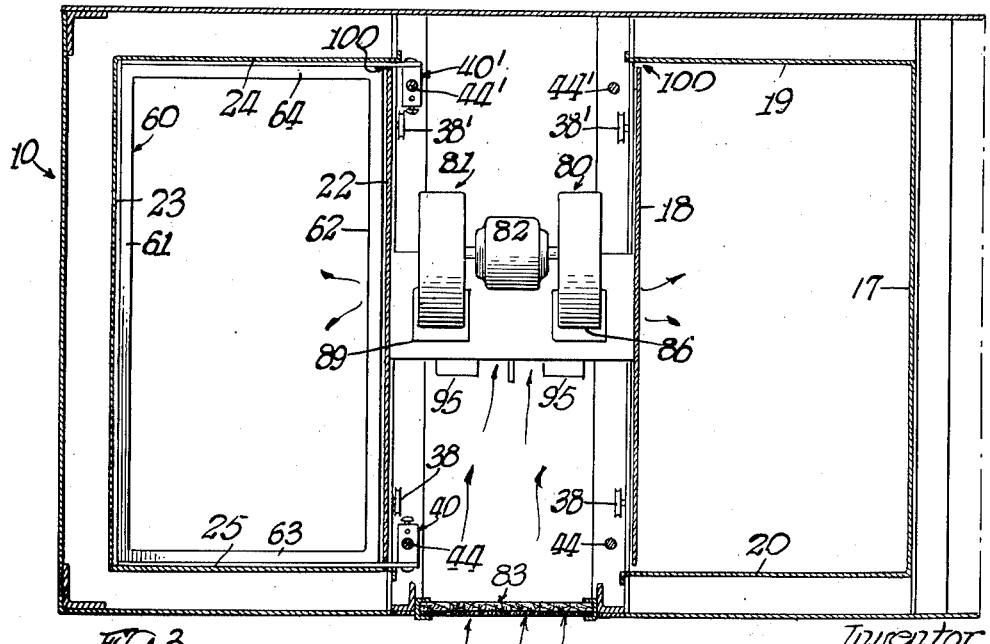

Aug. 27, 1957 C. J. CRETORS 2,803,891
DEVICE FOR STORING AND DISPENSING POPCORN AND THE LIKE
Filed Aug. 13, 1953 3 Sheets-Sheet 3

Inventor
Charles J. Cretors
Thiess, Olson, Mecklenburger,
von Holst, & Coltman. Attys United States Patent Office 2,803,891
Patented Aug. 27, 1957

2,803,891

DEVICE FOR STORING AND DISPENSING POPCORN AND THE LIKE

Charles J. Cretors, Highland Park, Ill., assignor to C. Cretors & Co., Chicago, Ill., a corporation of Illinois Application August 13, 1953, Serial No. 374,043

9 Claims. (Cl. 34—214)

The invention relates generally to a device for storing and dispensing popcorn and the like, but relates more particularly to means for storing quantities of previously popped corn in a so-called commercial type popcorn machine and for facilitating removal therefrom.

As a typical illustration of a so-called commercial type popcorn machine, reference may be made to popcorn machines such as are commonly used at places of amusement. At such places the demand for popcorn varies widely at different periods. The corn is popped in what is known as a popping kettle or pan which, of course, has a limited capacity. While the size of popping pans or kettles varies, it is hardly feasible to provide a popping pan with a capacity sufficient to supply the maximum demand. For this reason it is the practice to pop a considerable quantity of corn in advance so that it will be available for use at the time of maximum demand, to supplement that popcorn which is currently being popped.

However, the storage of popcorn presents a considerable problem. Popped corn has a great capacity to absorb moisture. Because of this fact and also because of the seasoning in which the corn is usually popped, it is difficult to maintain the previously popped and stored corn in a fresh and appetizing condition.

The general object of the invention is to provide improved and simplified means whereby a quantity of corn may be popped and stored in a condition for convenient dispensing when required.

Another object of the invention is to provide improved and simplified means whereby large volumes of corn may be popped in advance; stored in a manner convenient for later use, and in the meantime maintained in such condition that when sold or dispensed it retains substantially the characteristics of freshly popped corn.

Again it is an object of the invention to provide a storage arrangement which can be embodied in a commercial type popping machine whereby the popcorn in the storage compartments may, as required, be quickly and easily lifted to a position for removal by the operator at the time the corn is sold.

Still another object of the invention is to provide improved and simplified means whereby a plurality of storage compartments may be embodied in a single popping machine with independent means for lifting or raising the stored product from the separate bins, as demand requires.

The above mentioned objects of the invention as well as others, together with the advantages thereof will more fully appear as the specification proceeds to describe the accompanying drawings which illustrate the general embodiment of the invention.

In the drawings:

Fig. 1 is a perspective view of a so-called commercial type popcorn machine embodying the invention, as viewed from the side where the operator stands.

Fig. 2 is a vertical sectional view, substantially on the line 2—2 of Fig. 1, viewed in the direction of the arrows.

Fig. 3 is a sectional view, substantially on the line 3—3 of Fig. 2.

Fig. 6 is a schematic perspective view illustrating the elevator mechanism, such as is used in each storage bin.

Fig. 7 is an enlarged sectional view through the elevator frame supporting means, as viewed substantially along the line 7—7 of Fig. 6.

Figures 4, 5:
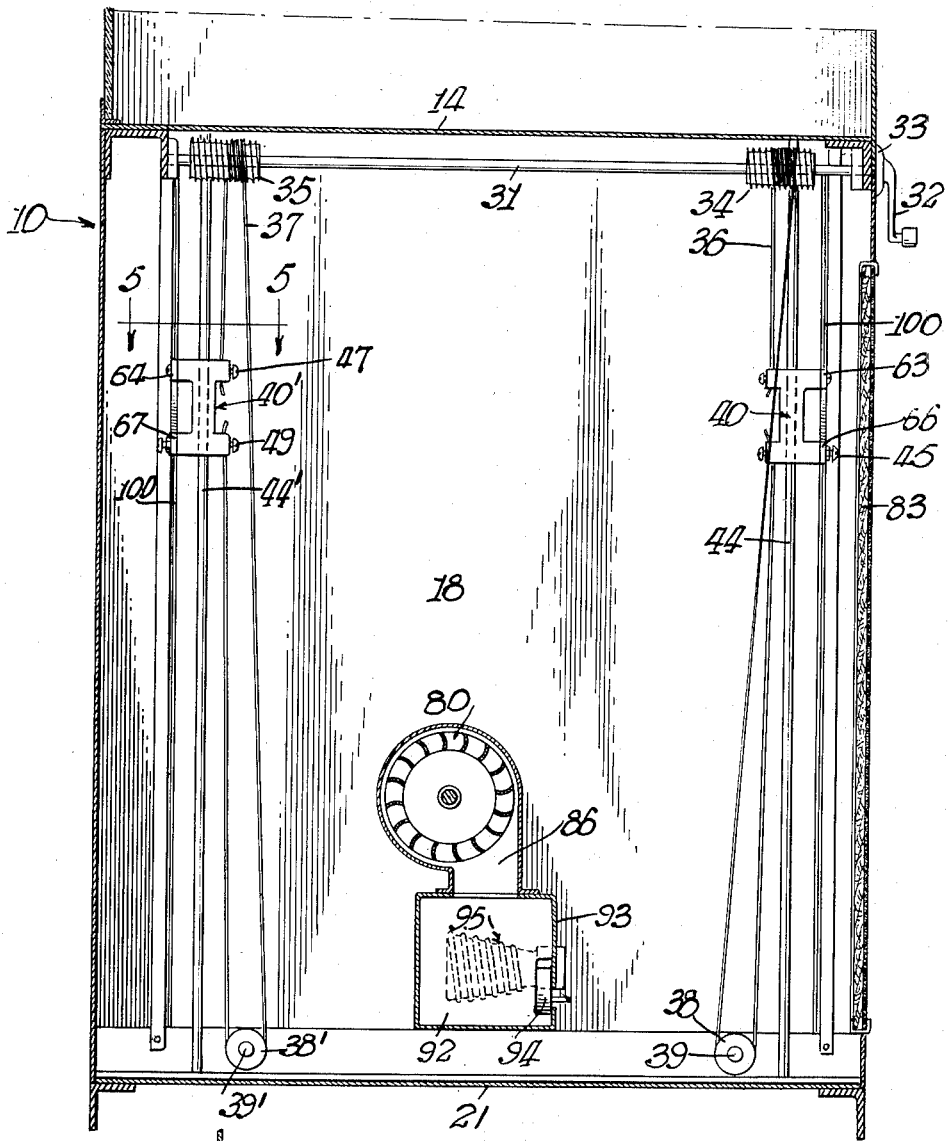
Fig. 4 is an enlarged sectional view on the line 4—4 of Fig. 2.
Fig. 5 is a fragmentary detail section on the line 5—5 of Fig. 4.

Referring first particularly to Fig. 1, 10 represents a so-called commercial popcorn machine, having a number of drawers 11 for the storage of varying amounts of unpopped corn, popping oil, cartons and other items, which are used in the popping of corn and in the sale of the popped corn to the purchasers. The machine has been illustrated in order to show the general relationship of the features, to which this invention more particularly relates.

At the top of one end of the specific machine illustrated there is positioned a popping kettle 12, into which a batch of unpopped corn is placed, there being suitable means for supplying heat to the bottom of the pan to cause popping. When a batch of corn has been popped the popping pan is swung in the direction of the arrow by means of the handle 13, so as to dump the popcorn onto the top plate cabinet area 14, the kettle again being returned to the position shown in the drawing, so that another batch of corn may be popped.

As before stated, the machines of this type are generally used in places of amusement or other places where the demand for popcorn varies widely at different times. As a practical matter, therefore, it is not feasible to provide a popping pan 12 of the capacity which currently will pop corn in quantities sufficient to supply the maximum demand. Hence, the practice of popping quantities of corn in advance and storing the same for future sale.

The present invention provides improved means for storing and facilitating the removal of the corn from the storage chambers.

Referring now more particularly to the sectional views, the cabinet of the machine is provided with a pair of storage bins 15 and 16. The storage chamber 15 is defined by upright side walls 17 and 18, and end walls 19 and 20, the bottom being closed by a plate 21 which extends throughout the entire bottom of the cabinet.

The chamber 16 is formed by side walls 22, 23, and end walls 24 and 25, the bottom being closed by the aforementioned bottom plate 21 of the machine.

Both storage chambers 15 and 16 are open at the top, through the cabinet top plate, the plates defining the chambers 15 and 16 being attached at the top to the various cabinet structural frame members 26, 27, 28 and 29.

It will be noted that the storage compartments 15 and 16 are spaced apart, the intervening chamber 30 accommodating mechanism for raising and lowering the elevators and also means for supplying filtered heated air to the storage compartments. Before describing the air supply and heating means, the elevator mechanism will be described.

*The elevator mechanism*

A separate elevator and means for manipulating the same is provided for each of the two compartments 15 and 16. Since they are alike in construction, a description of one will suffice for both. The structure of the elevator will be best understood by reference to Figs. 6 and 7. At the top there is an operating shaft 31 which, at the end where the operator stands, is provided with a handle 32 whereby the shaft may be rotated in either direction. The shaft 31 extends between the front and rear walls of the cabinet, a portion of the shaft extending through the rear wall and being connected to the operating handle 32. A circular plate 33 is applied where the shaft 31 projects through the cabinet wall, so as to provide a finished appearance at that point.

On the shaft 31 and affixed to rotate therewith are two grooved sheaves 34 and 35 respectively, around which cables 36 and 37 are trained. The cable 36 is also trained around a sheave 38 at the bottom, the sheave 38 being mounted on a shaft 39 disposed at right angles to the shaft 31. The shaft 39 for the sheave 38 is carried by one of the lower frame members of the machine, as is perhaps best shown in Fig. 4.

40 represents a carriage which has sliding movement on the vertical guide rod 44. The carriage 40 is provided at the bottom with openings 41 and 42. In the opening 42 is a disc 43 of oiled leather or other suitable friction material which may be pressed against the guide rod 44 by means of the screw 45. The pressure applied by screw 45 and by the corresponding element of the other carriage 40' associated with the other rod 44', is of such order that when supplementing the inherent clamping action of the cantilevered load, as later explained, the carriage will remain in any placed position, even when supporting the maximum load which the elevator platform is designed to support.

One end 36A of cable 36 is passed through an opening 46 in the upper part of carriage 40, being clamped or crimped in binding position by a screw 47, which operates in the threaded opening 48 at the upper part of the carriage 40.

The other end 36B of the cable 36 is similarly clamped in the lower part of the carriage 40 by means of a screw 49 operating in the threaded opening 50, the cable end 36B passing into and through the opening 51. In this way it can be seen that the cable 36, in effect, becomes an endless cable so that upon turning the shaft 31 in one direction the carriage 40 will be elevated and when moved in the other direction the carriage will be lowered, remaining however in any placed position by virtue of the construction before described.

Since the cable 37 is similarly fixed to the carriage 40', and extends around a sheave 38' at the bottom, carried by the shaft 39', it is obvious that carriages 40 and 40' will move synchronously upwardly and downwardly, depending upon the direction of rotation of the shaft 31.

60 as a whole represents a platform for supporting a perforated plate structure on which the popcorn, either in bulk or in packages, is supported, as will be explained later. The platform 60 comprises a rectangular frame composed of the two parallel members 61 and 62, which are cross-connected at their ends by members 63 and 64. The platform is supported from the carriage members 40 and 40' by edgewise disposed narrow bar members 63' and 64' which are attached to the platform frame. Projecting end portions 63E and 64E, in turn, are clamped to the upper parts of carriage structures 40 and 40' respectively by means of the clamp screw 65 on the member 40 and a similar screw on the member 40'. Further to support the frame structure 60 are diagonal bar-like brace members 66 and 67. The lower end portion of the bar member 66 is attached to the carriage 40, being held in place by a nut 68 on the screw 45, the upper end of the member 66 being rigidly secured to the frame member 63. The ends of the member 67 are similarly attached to the carriage 40' and the member 64 respectively. The structure described, in effect, forms a cantilever arrangement for supporting the platform, which is of simple construction, yet light and strong and abundantly able to support the maximum load which the elevator is designed to support.

As is best shown in Fig. 2, there is mounted on the elevator platform 60 a removable popcorn supporting structure 70. The structure 70 comprises an upper perforated plate 71 which, in turn, is attached to a pair of side channel frame members 72—73, thus making an integral device which may be bodily lifted from the support on the elevator platform 60 by means of the handle 74. The handle 74, as is shown in Fig. 2, is of such construction that when not in use it slides by gravity to a lower position. When it is desired to lift the structure 70 it is but necessary to pull upwardly on the handle, whereupon the lower projecting portions 74' will engage the under side of the plate 71.

*Air supply and heating structure*

In order to supply filtered heated air to the popcorn, which may be stored in the compartments 15 and 16, there is provided a pair of blowers 80, 81 driven by a common motor 82. The air to supply the blowers passes through the filtered air inlet 83, thence into the inlets 84 and 85 respectively of the blowers 80, 81.

The blower 80 discharges downwardly through a duct 86 into a compartment 87, which compartment 87 leads through an opening 88 in the adjacent wall of the storage compartment 15.

The blower 81 discharges through a duct 89, which leads into a compartment 90, which in turn communicates through on opening 91 with the storage compartment 16. 92 is a vertical wall defining part of the chambers 87 and 90, which wall, as illustrated in Fig. 4, is partly cut out adjacent the wall 93, thus forming a small connecting air passageway between the two compartments 87 and 90, acting upon a centrally disposed thermostatic element 94. The single thermostatic element 94 controls the temperature of the air as heated by the electrical heating elements 95 and 96 in compartments 87 and 90 respectively. The heating elements, of course, are connected to a suitable source of electric energy, as also is the motor 82.

It is believed that the remaining features of the machine will be understood by a description of its operation.

*Operation of the machine*

Assuming that there is no popcorn in either of the storage compartments or wells 15 and 16, and the operator desired to fill storage chamber 15 with bulk popcorn and chamber 16 with packaged corn. The operator would, assuming the platforms were not properly placed, first turn cranks 32 and 32' which, through the shaft 31 of one elevator mechanism and the similar shaft of the other elevator mechanism, would cause both platforms to be moved to the proper positions, i. e. the platform in chamber 15 to the bottom and the platform in chamber 16 to the top.

The operator may then proceed to pop a number of batches of corn in the popping kettle or pan 12, dumping each batch as popped, into the horizontal wall 14 of the machine, whereupon some of the popcorn would automatically fall into the compartment until it found support upon the perforated plate 71 of the structure 70 carried by the elevator framing 60. Such popcorn as did not automatically fall into the compartment 15 would be swept thereinto by the operator. This procedure could be continued until the compartment was filled with popcorn up to the top of the compartment and slightly above, as indicated at the right hand side of Figs. 1 and 2. In this condition a good display would be made of the popped corn. Probably, however, the operator would also be engaged in placing popped corn in cartons to be placed in chamber 16.

A complete tier or layer of packaged popcorn would be placed upon the perforated plate of the elevator mechanism in chamber 16. As soon as the tier or layer of packages was completed the elevator would be moved downwardly a distance equal to the height of the package so that the operator then could conveniently place another tier or layer of packages upon the tier previously placed on the elevator. This practice would be continued until the elevator is located at the bottom of the compartment, the entire compartment 16 then being filled wih packaged popcorn.

While it has heretofore been stated that the elevators would be moved to the bottom, obviously it would not be necessary to move them in every instance to the bottom, if it were desired to start with lesser amounts of popcorn either in bulk or in cartons or packages.

It will, of course, be understood that when the compartments 15 and 16 contain a supply of either bulk or packaged popcorn the blowers 80 and 81 will be in operation, supplying heated filtered air to the lower parts of the compartments, which air being under pressure, moves upwardly through the respective compartments, discharging at the top. In the course of such movement, air makes contact either with the bulk popcorn or the containers of the packaged corn, as the case may be, thus maintaining the popcorn in crisp, appetizing condition.

As is obvious from Figs. 1 and 2, if there is any popcorn, either bulk or packaged, on either of the elevator platforms, by locating the elevators at the proper level, the popcorn, or packages, as the case may be, will be visible. To the observer, therefore, it will appear that there is a full supply, thus giving a good display effect.

It will be understood that the structures 70, which rest upon the cantilever elevator platform, may be entirely removed by merely lifting the same through the medium of the handle 74 when there is no product in the compartment. This permits ready cleaning of the parts on which the popcorn, either bulk or packaged, directly rests.

While only one storage compartment 16 has been illustrated as having bulk popcorn, it is obvious that, if desired, both may contain either bulk or packaged corn.

It will be noted that all of the operating mechanism for both elevators is located in the chamber or space between the two storage chambers 15 and 16. The platforms for supporting the popcorn are, of course, located in the respective storage chambers. Since these platforms are supported from the carriage member 40 by the end portions 63' and 64' of members 63 and 64 and portions associated with carriage 40' it is necessary to provide narrow vertical slots in the inner side walls of chambers 15 and 16 through which the end portions can project. The slots best appear in Fig. 3 and bear the reference character 100.

Reference has heretofore been made to the clamping action of the cantilevered load. This action should now be clear when it is recognized that the platforms are disposed within the storage chambers, being carried by cantilever-like members which find their support on the carriage members 40 and 40' disposed outside the storage chamber. Any load imposed on the platform, therefore, tends to tilt or cant the whole structure, including the carriages 40, 40', thereby causing the carriages to have a general binding action on the rods upon which they are designed to move.

It has been discovered that if reliance be had wholly upon the general binding action which the cantilevered load provides, there is, under certain conditions, a tendency of the carriages to chatter when moving along the rods.

To overcome this objectionable action means for varying the resistance to movement along the rods, which the inherent binding action of the cantilevered load provides, is supplied. This function is performed by the heretofore described screw pressured disc 43.

It is believed that the many advantages of the invention will be understood by those skilled in the art to which this appertains, without further comment.

I claim:

1. A device for storing and dispensing popcorn and the like comprising a cabinet, a pair of vertically disposed open top storage compartments therein, said compartments being spaced apart to provide an intermediate chamber, a pair of blowers positioned in said chamber, a common motor for operating said blowers, means communicating the discharge outlet of one blower with the bottom part of one compartment, and means communicating the discharge outlet of the other blower with the bottom part of the other compartment whereby air may be simultaneously discharged into both compartments.

2. A device for storing and dispensing popcorn and the like comprising a cabinet, a pair of vertically disposed open top storage compartments therein, said compartments being spaced apart to provide an intermediate chamber, a pair of blowers positioned in said chamber, a common motor for operating said blowers, means communicating the discharge outlet of one blower with the bottom part of one compartment, means communicating the discharge outlet of the other blower with the bottom part of the other compartment, and common thermostatic means positioned to be subjected to the temperature of air discharged by both blowers, thereby to control the temperature of the air discharged into both storage compartments.

3. A device for storing and dispensing popcorn and the like comprising a vertically disposed storage compartment therein, a platform positioned across said compartment, means for positively causing vertical movement of said platform in both directions in said compartment, said means including vertically slidable structure positioned externally of said compartment and means carried thereby for supporting the platform.

4. A device for storing and dispensing popcorn and the like comprising a vertically disposed storage compartment therein, a platform positioned across said compartment, means for positively causing vertical movement of said platform in both directions in said compartment, said means including vertically slidable structure externally of said compartment, and cantilever-like means carried by said vertically slidable structure for supporting said platform.

5. A device for storing and dispensing popcorn and the like comprising a vertically disposed storage compartment therein, a platform positioned across said compartment, means for causing vertical movement of said platform in said compartment, said means including a pair of vertically disposed guide members positioned externally of said compartment, a pair of carriage members, one slidably mounted on each of said guide members, and structure attached to said carriage members and extending into supporting relationship to said platform in said compartment.

6. A device for storing and dispensing popcorn and the like comprising a vertically disposed storage compartment, a platform positioned across said compartment, vertically disposed means positioned externally of said compartment, carriage means positioned for sliding movement on said vertically disposed means, means for supporting said platform from said carriage means, means positively causing movement of said carriage means in both directions, and means for holding said carriage means in any placed position.

7. An elevator structure embodying therein a vertical chamber, a platform positioned across the chamber, vertically disposed structure positioned externally of said chamber, carriage means movable on said vertically disposed structure, cantilever structure carried by said carriage means and supporting said platform, whereby any load upon the platform tends to bind the carriage means against movement on said vertically disposed structure.

8. An elevator structure embodying therein a vertical chamber, a platform positioned across the chamber, vertically disposed guide means positioned externally of said chamber, carriage means movable on said vertically disposed guide means, means for positively moving said carriage means in both directions, cantilever structure carried by said carriage means and supporting said platform, whereby any load upon the platform tends to bind the carriage means against movement on said vertically disposed guide means.

9. An elevator structure embodying therein a vertical chamber, a platform positioned across the chamber, vertically disposed guide means positioned externally of said chamber, carriage means movable on said vertically disposed guide means, means for positively moving said carriage means in both directions, cantilever structure carried by said carriage means and supporting said platform, whereby any load upon the platform tends to bind the carriage means against movement on said vertically disposed guide means, and means for positively varying the frictional resistance of the carriage means in movement on said vertically disposed guide means.

References Cited in the file of this patent

UNITED STATES PATENTS

| | | |
|---|---|---|
| 660,408 | Wolf | Oct. 23, 1900 |
| 1,144,622 | Tyrell | June 29, 1915 |
| 1,305,600 | Goubert | June 3, 1919 |
| 1,306,431 | Klemme | June 10, 1919 |
| 1,539,976 | Vernaci et al. | June 2, 1925 |
| 1,748,032 | Weidman | Feb. 18, 1930 |
| 2,113,035 | Shaw et al. | Apr. 5, 1938 |
| 2,529,877 | Lodge | Nov. 14, 1950 |
| 2,608,004 | Pinanski | Aug. 26, 1952 |